US011546464B1

(12) United States Patent
Ruinskaya

(10) Patent No.: US 11,546,464 B1
(45) Date of Patent: Jan. 3, 2023

(54) CLOUD-BASED PRIVATE BRANCH EXCHANGE CALL FLIP

(71) Applicant: Intermedia.net, Inc., Sunnyvale, CA (US)

(72) Inventor: Maria Ruinskaya, Sunnyvale, CA (US)

(73) Assignee: Intermedia.net, Inc., Sunnyvale, CA (US)

( * ) Notice: Subject to any disclaimer, the term of this patent is extended or adjusted under 35 U.S.C. 154(b) by 0 days.

(21) Appl. No.: 17/391,394

(22) Filed: Aug. 2, 2021

(51) Int. Cl.
*H04M 7/00* (2006.01)
*H04M 3/42* (2006.01)
*H04M 3/436* (2006.01)
*H04M 3/02* (2006.01)
*H04M 7/12* (2006.01)
*H04M 3/58* (2006.01)

(52) U.S. Cl.
CPC ......... *H04M 3/42314* (2013.01); *H04M 3/02* (2013.01); *H04M 3/436* (2013.01); *H04M 3/58* (2013.01); *H04M 7/126* (2013.01); *H04M 2203/2033* (2013.01)

(58) Field of Classification Search
CPC .... H04M 3/42314; H04M 3/02; H04M 3/436; H04M 3/58; H04M 7/126; H04M 2203/2033
USPC ..................... 379/220.01, 221.01, 230, 229, 379/265.01–265.2, 266.01
See application file for complete search history.

(56) References Cited

U.S. PATENT DOCUMENTS

| | | | | |
|---|---|---|---|---|
| 8,107,957 B1* | 1/2012 | O'Neil | ............. | H04M 3/42229 455/445 |
| 8,582,733 B1* | 11/2013 | Larson | ............. | H04M 3/42212 379/201.01 |
| 9,065,918 B2 | 6/2015 | Jachner | | |
| 2009/0097628 A1* | 4/2009 | Yap | ......................... | H04M 3/56 379/202.01 |
| 2013/0157636 A1* | 6/2013 | Ryan | ...................... | H04W 4/16 455/417 |
| 2013/0225235 A1* | 8/2013 | Elter | ...................... | H04W 4/16 455/555 |
| 2015/0382280 A1* | 12/2015 | Gray | ................... | H04M 7/0057 370/331 |
| 2017/0064086 A1* | 3/2017 | Mandalia | ............. | H04M 3/367 |
| 2017/0126895 A1* | 5/2017 | Tevonian | ............ | H04L 65/1063 |
| 2019/0373027 A1* | 12/2019 | Ravichandran | ..... | H04L 65/1093 |

* cited by examiner

*Primary Examiner* — William J Deane, Jr.
(74) *Attorney, Agent, or Firm* — Schwegman Lundberg & Woessner, P.A.

(57) ABSTRACT

In an example embodiment, a cloud-based unified communications solution and collaboration platform is provided that includes private branch exchange (PBX) business phone service, among other services, in one interface. Furthermore, in an example embodiment, this cloud-based unified communications solution enables a feature called "call flip," which allows a user to transfer an active phone call from one device of the user to another device of the same user, without disconnecting the phone call, and despite both devices sharing a common extension or phone number. More particularly, the system is able to detect that a user wishes to perform a "call flip", identify the device from which the user is attempting to perform the call flip, identify the other devices associated with the user, and then ring only the other devices and not the device from which the user is attempting to perform the call flip.

20 Claims, 6 Drawing Sheets

CLOUD-BASED PRIVATE BRANCH EXCHANGE CALL FLIP

TECHNICAL FIELD

This application relates generally to telephone devices. More specifically, this application relates to technology that enables calls to be flipped from one telephone device to another.

BACKGROUND

Many organizations utilize a private branch exchange (PBX) to manage telephone calls within the organization. Users of a PBX can communicate internally and externally. External communications can be handled using analog telephone networks such as public switched telephone networks (PSTNs), or using digital networks such as Voice over IP (VoIP) networks. A PBX allows an organization to have more phones and other devices such as fax machines than physical phone lines, and provides features such as transferring calls, voice mail, call recording, interactive voice menus, and call queues.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
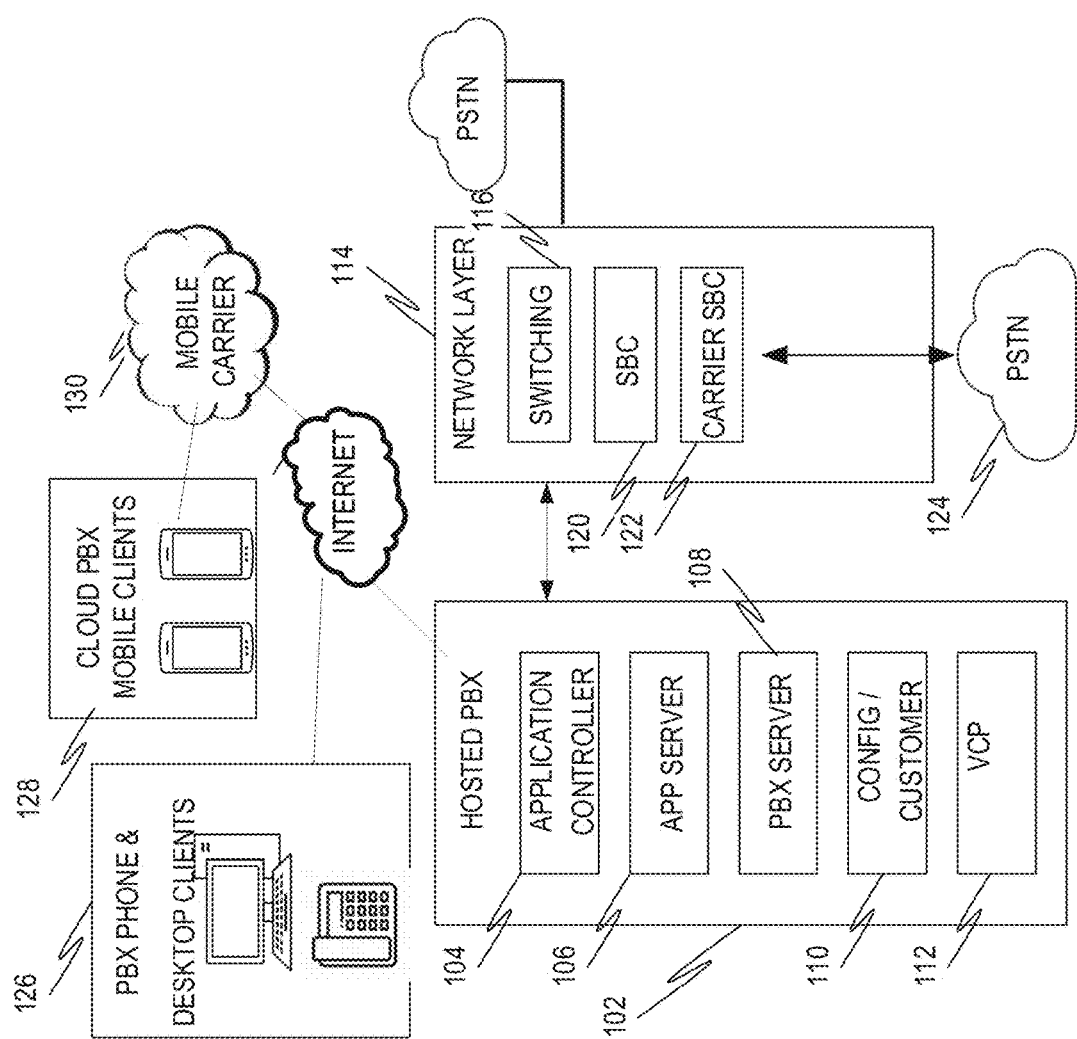
FIG. 1 is a block diagram illustrating a system for performing call flip functionality, in accordance with an example embodiment.

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As employees of organizations utilize mobile devices and desktop computers to take and receive phone calls more and more often, and as the line between work life and home life continues to erode, alternative solutions to PBXs are being implemented by many organizations. Specifically, organizations desire to have a more unified approach where calls can be made or received on any number of different types of devices, as well as individual users maintaining multiple devices from which these calls can be made or received. Additionally, in the situation where a user may maintain multiple devices, it is desirable for all of these devices to be reachable using a single phone number of an extension, so that, for example, an incoming call to the user will ring on all the user's devices.

A specific technical issue that arises with such solutions, however, is how to handle the case where a user wishes to transition from one device to another during a call without disconnecting the call. An example use case would be an employee who is on a work call at a desk phone at an office and then wishes to continue the call on his or her drive home, and thus the user wishes to utilize a cellular device for the remainder of the call.

Enabling a user to transition from one device to another without disconnecting a call, however, can be difficult. While traditional phone systems allow for the transfer of calls from one extension or phone number to another, they do not allow for the transfer of calls from two different devices that share the same extension or phone number. Thus, for example, transferring a call "to yourself" results in either a busy signal or having the call sent to voice mail, but does not result in another device accepting the call and the call transferring to the new device.

In an example embodiment, a hosted PBX enables a feature called "call flip," which allows a user to transfer an active phone call from one device of the user to another device of the same user, without disconnecting the phone call, and despite both devices sharing a common extension or phone number. More particularly, the system is able to detect that a user wishes to perform a "call flip", identify the device from which the user is attempting to perform the call flip, identify the other devices associated with the user, and then ring only the other devices and not the device from which the user is attempting to perform the call flip.

FIG. 1 is a block diagram illustrating a system 100 for performing call flip functionality, in accordance with an example embodiment. More particularly, the call flip functionality may be implemented in a hosted PBX 102, which may include an application controller 104, app server 106, PBX server 108, configuration component 110, and voice control panel (VCP) 112. The application controller 104 acts to control one or more applications running on app server 106. PBX server 108 specifically handles call routing of calls. Configuration component 110 is where customer-specific configurations may be maintained and followed, and VCP 112 is a graphical user interface that can be used for setting up and/or editing the configurations.

The hosted PBX 102 may connect to a network layer 114, which contains a switching component 116 that performs packet switching, as well as a session border controller (SBC) 120 that communicates with the Internet 118. A separate carrier SBC 122 may communicate directly with a PSTN 124.

Users of the hosted PBX 102 may maintain devices such as phone/desktop clients 126 and mobile clients 128. The phone/desktop clients 126 may connect directly to the hosted PBX 102, while mobile clients may communicate through the Internet 118 via a mobile carrier 130 (or directly via WiFi connections).

In another example embodiment, a cloud-based unified communications solution and collaboration platform is provided that includes PBX business phone service, among other services, in one interface. The call flip functionality may alternatively be implemented in such a cloud-based unified communications solution.

Figure 2:
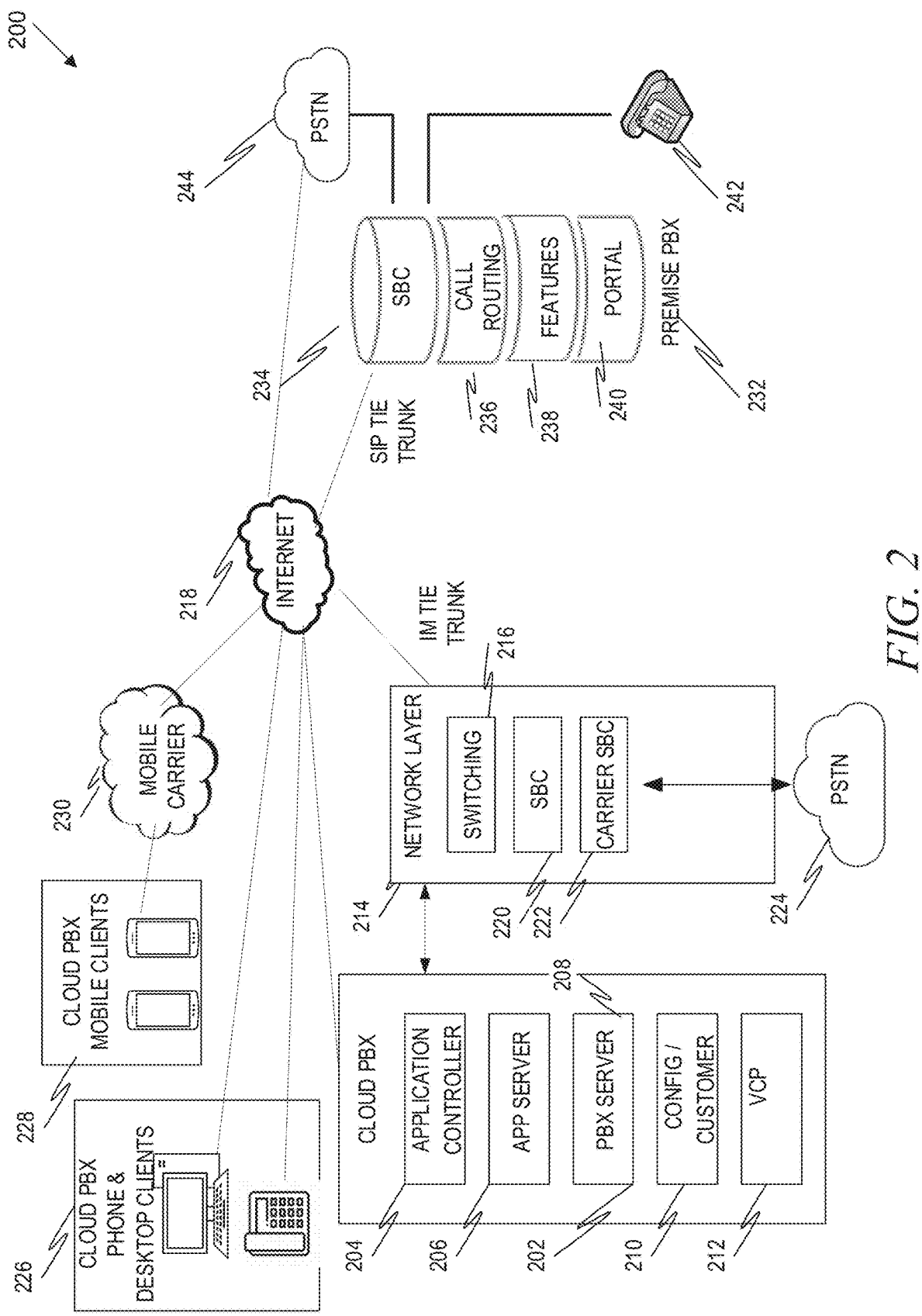
FIG. 2 is a block diagram illustrating a system for unified communications in accordance with an example embodiment.

FIG. 2 is a block diagram illustrating a system 200 for unified communications in accordance with an example embodiment. The term "unified communications" means that many different types of communications are handled through a single platform, including, for example, traditional phone calls (such as PBX and PSTN calls), presence tracking (such as tracking if employees are available for communications or not), chat and text functions, video conferencing, and file management. The unified communications platform may be referred to as "an external PBX 202," and may include an application controller 204, app server 206, PBX server 208, configuration component 210, and voice control panel (VCP) 212. The application controller 204 acts to control one or more applications running on app server 206. It should be noted that app server 206 may actually be multiple app servers operating for different applications available as part of the unified communications platform, including potentially separate applications for voice communication, chat/text, video conferencing, and file management. PBX server 208 specifically handles call routing of calls. Configuration component 210 is where customer-specific configurations may be maintained and followed, and VCP 212 is a graphical user interface that can be used for setting up and/or editing the configurations.

The external PBX 202 may connect to a network layer 214, which contains a switching component 216 that performs packet switching, as well as a session border controller (SBC) 220 that communicates with the Internet 218 via a SIP tie trunk. A separate carrier SBC 222 may communicate directly with a PSTN 224.

Users of the external PBX 202 may maintain devices such as phone/desktop clients 226 and mobile clients 228. The phone/desktop clients 226 may connect directly through the Internet 218 via Ethernet or WiFi connections, for example, while mobile clients 228 may communicate through the Internet 218 via a mobile carrier 230 (or directly via WiFi connections).

PBX 232 may maintain its own SBC 234, as well as a call routing component 236, features component 238, and portal 240. The features component 238 may offer various PBX features such as internal text and presence features. A user of the PBX 232 may have a hardwired client 242, and the PBX 232 may connect to a PSTN 244.

A call flip may be initiated in a number of different ways. In one example embodiment, the call flip is initiated by the device on which the user is operating, causing a transfer request to be generated to transfer the active call to the user's own extension. The system 200 is set up to recognize that this transfer to the user's own extension should be handled differently than a typical transfer request (as a typical transfer request to one's own extension often results in a busy signal or being sent to voice mail).

In an example embodiment, certain user devices may be distributed that include a dedicated button for initiating the call flip. For example, the hardwired client 242 may be such a device. This button is factory programmed to transfer the active call from the hardwired client 242 to the extension associated with the hardwired client 242. In other example embodiments, a field-programmable button on a device may be programmed to transfer the active call from the device to the extension associated with the device. This may be the case for devices that have a blank button that a user is able to program to perform a task. In another example embodiment, a device may manually activate a call flip using a transfer button or command and manually enter the user's own extension.

Activating the call flip causes the active call to be put on hold while the "transfer" is attempted. Additionally, in an example embodiment, after the call flip is initiated, if the user does not pick up one of the other devices that is being rung from the call flip within a predetermined amount of time (e.g., 20 seconds), then the call flip is cancelled and the original device is rung back.

Figure 3:
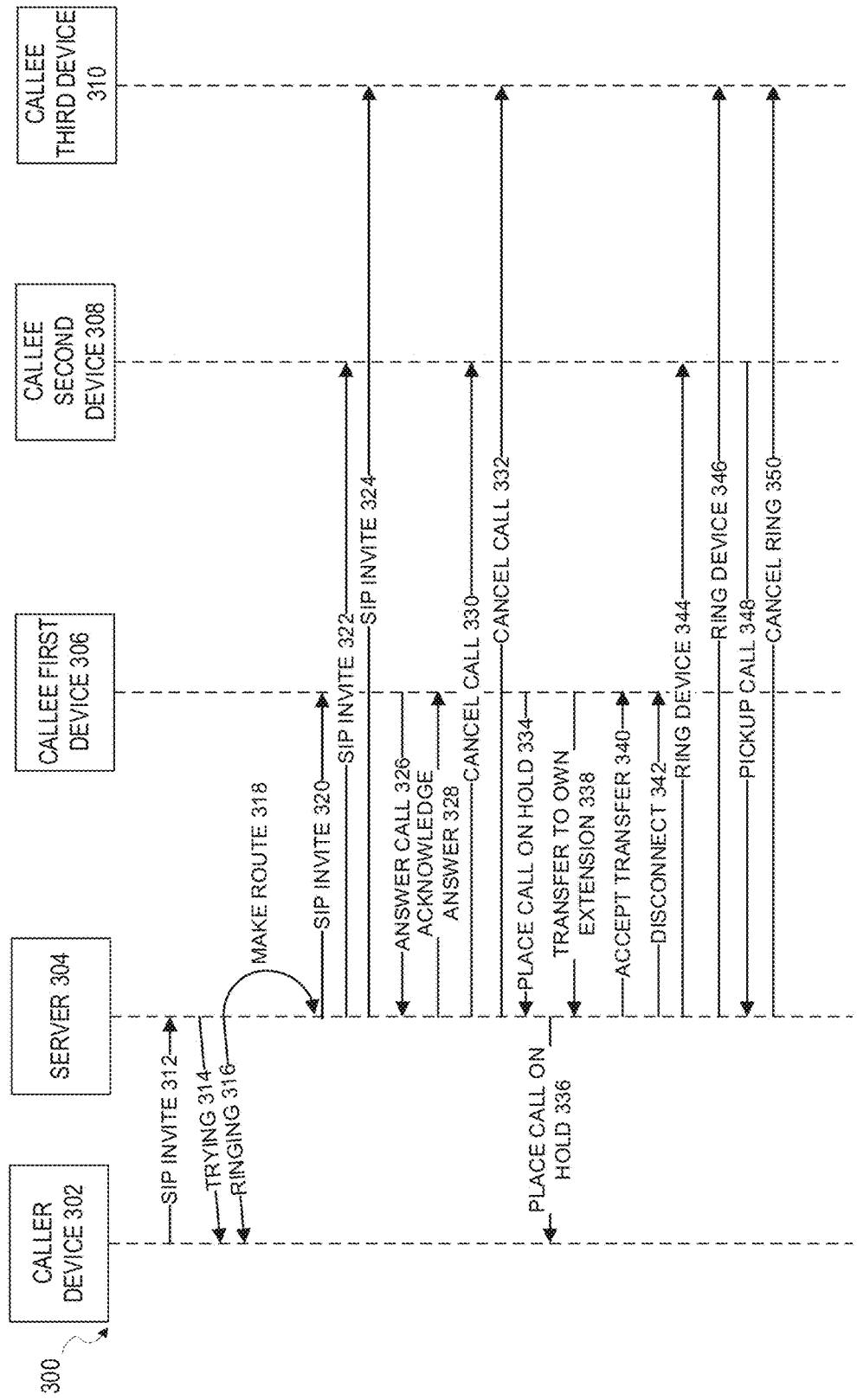
FIG. 3 is a call flow diagram illustrating a method for a session initiation protocol (SIP) blind call transfer request in accordance with an example embodiment.

In an example embodiment, the call flip is enabled using a SIP blind call transfer request. FIG. 3 is a call flow diagram illustrating a method 300 for a SIP blind call transfer request in accordance with an example embodiment. Here, there is an internal call from user p1 with extension 104 to user p2 with extension 101. User p1 has three phone devices. User p1 picks up the call on one device and after that initiates a call flip and picks up the call on a different device. This diagram shows the caller device 302, a server 304, a callee first device 306, a callee second device 308, and a callee third device 310. When user p1 initiates the call from caller device 302, a SIP INVITE request is generated to the server 304 at operation 312. In an example embodiment, this SIP invite request may be in the following form:

INVITE
>received from: 109.167.160.13:5104
>received to: 222.222.22.22:5060
>size: 1129
INVITE sip:101@qapbx-ca1.qaserverdata.net:5060 SIP/2.0
Via. SIP/2.0/UDP
192.168.1.135:5104;
branch=z9hG4bKc6a598887010737ec;rport
Max-Forwards: 69
From: p-4<sip:WWW@qapbx-ca1.qaserverdata.net>;
tag=46d182ccb8
To: 101<sip:101@qapbx-ca1.qaserverdata.net:5060>
Call-ID: e404538171cb94b4@192.168.1.135:5104
CSeq: 1819112374 INVITE
Allow: INVITE, ACK, CANCEL, BYE, NOTIFY, REFER, OPTIONS, UPDATE, PRACK
Authorization: Digest username="WWW",realm="qapbx-ca1-1.qaserverdata.net",
nonce="YO7aR2Du2RvYpe3eqO1MtngVIUyH9kGT",uri="sip:101 @qapbx-c
a1.qaserverdata.net:5060",
response="3af377eca419f8612641ea7567ff0959"
Contact: p-4<sip:WWW@192.168.1.135:5104;
transport=udp>
Privacy: none
Supported: 100rel, replaces
User-Agent: NECSDT900_ITK-6DGS/
5.4.1.6_F8B79745A496
Content-Type: application/sdp
Content-Length: 293
v=0
o=-0 0 IN IP4 192.168.1.135
s=
c=IN IP4 192.168.1.135
t=0 0
m=audio 30000 RTP/AVP 9 0 18 8 101
a=rtpmap:9 G722/8000
a=rtpmap:0 PCMU/8000
a=rtpmap:18 G729/8000
a=rtpmap:8 PCMA/8000
a=rtpmap:101 telephone-event/8000 a=fmtp:18 annexb=no
a=fmtp:101 0-15
a=ptime:20
a=sendrecv

Notably, a device id (WWW) associated with the caller device 302 is included in the SIP INVITE request, along with the callee's extension (101). This allows either the caller or the callee to initiate the call flip as the server 304 contains information about both. In this example, the callee initiates the call flip.

Then the server 304 answers the caller device 302 by sending indications of a trying status at operation 314 and a ringing status at operation 316. The following are examples of a SIP Trying and SIP Ringing statuses.

SIP/2.0 100 Trying
Record-Route: <sip:222.222.22.22;lr;ftag=46d182ccb8>
Via: SIP/2.0/UDP
192.168.1.135:5104;received=109.167.160.13;
branch=z9hG4bKc6a5988870 10737ec;rport=5104
Call-ID: e404538171cb94b4@192.168.1.135:5104
CSeq: 1819112374 INVITE
From: "p-4"<sip:WWW@qapbx-ca1.qaserverdata.net>;
tag=46d182ccb8
To: "101"<sip:101@qapbx-ca1.qaserverdata.net:5060>;
tag=142531f3
Content-Length: 0
Max-Forwards: 70
Allow: INVITE,ACK,OPTIONS,BYE,CANCEL,REGISTER
Contact: "101"<sip:101@222.222.22.22:5060>
SIP/2.0 180 Ringing
Record-Route: <sip:222.222.22.22;lr;ftag=46d182ccb8>
Via: SIP/2.0/UDP
192.168.1.135:5104;received=109.167.160.13;
branch=z9hG4bKc6a5988870 10737ec;rport=5104
Call-ID: e404538171cb94b4@192.168.1.135:5104
CSeq: 1819112374 INVITE
From: "p-4"<sip:WWW@qapbx-ca1.qaserverdata.net>;
tag=46d182ccb8
To: "101"<sip:101@qapbx-ca1.qaserverdata.net:5060>;
tag=142531f3
Content-Length: 0
Max-Forwards: 70
Allow: INVITE,ACK,OPTIONS,BYE,CANCEL,REGISTER
Contact: "101"<sip:101@222.222.22.22:5060>

After that, at operation 318 the server 304 makes a route for the call. It tries to understand what it needs to do using information in a database, such as by using information about extensions and their owners to identify user p1 as being associated with extension 101, and then retrieving a set of call rules for user p1. These call rules indicate how and when devices for the corresponding user should be attempted and rung. For example, one rule may indicate that all devices should ring simultaneously for 30 seconds. Another rule might be that if the call is not answered after completing the first rule, then the call should be sent to voicemail. More complex rules are possible as well, such as setting which devices should ring at certain times or at certain locations (e.g., do not ring a home phone after 10 PM because the user's spouse may be sleeping).

Here, assume the rule indicates to ring all user devices simultaneously. As such, at operations 320, 322, and 324, a SIP invite command is sent to each of the callee's devices (callee first device 306, callee second device 308, and callee third device 310). Examples of such SIP invite commands are as follows (assume that callee first device 306 has an ID of XXX, callee second device 308 has an ID of YYY, and callee third device 310 has an ID of ZZZ).

INVITE sip:XXX@192.168.1.143:5101;transport=udp SIP/2.0
Record-Route: <sip:222.222.22.22;r2=on;lr=on;ftag=87064543>
Record-Route: <sip:127.0.0.1;r2=on;lr=on;ftag=87064543>
Via: SIP/2.0/UDP
222.222.22.22;
branch=z9hG4bK12d3.306fcfaf13490f11f30f
7f264f50bb71.0
Via: SIP/2.0/UDP
222.222.22.22:5060;received=222.222.22.22;
branch=z9hG4bK5bfaae5e;rpo
rt=5060
CSeq: 91501 INVITE
Call-ID: 11fc8d40-9154-4813-bbcd-584fbdee7593@qapbx-ca1:1
From: "p-4"<sip:104@222.222.22.22:5060>;tag=87064543
To: "p-1"<sip:XXX@222.222.22.22:5060>
Content-Length: 291
Max-Forwards: 69
Allow: INVITE,ACK,OPTIONS,BYE,CANCEL,REGISTER
Cisco-Guid: cfb4aff2-3553-487f-9bde-7f72845d417c
P-AL-LEID: 1067520
P-AL-GID: cfb4aff2-3553-487f-9bde-7f72845d417c:1:1
X-Feature: call_type=regular
Content-Type: application/sdp
Contact: "p-4"<sip:104@222.222.22.22:5060>
v=0
o=-1 1 IN 1P4 222.222.22.22
s=SIP call
c=IN IP4 222.222.22.22
t=0 0
a=sendrecv
m=audio 43140 RTP/AVP 9 0 18 8 101
a=rtpmap:9 G722/8000
a=rtpmap:0 PCMU/8000
a=rtpmap:18 G729/8000
a=fmtp:18 annexb=no
a=rtpmap:8 PCMA/8000
a=rtpmap:101 telephone-event/8000
a=ptime:20
a=sendrecv
INVITE sip:YYY@10.9.219.81:5747 SIP/2.0
Record-Route: <sip:222.222.22.22;r2=on;ir=on;ftag=063caalc>
Record-Route: <sip:127.0.0.1;r2=on;lr=on;ftag=063caalc>
Via: SIP/2.0/UDP
222.222.22.22;branch=z9hG4bKdcf2.4e8e0770be607d64
6f673efbc80f97f5.0
Via: SIP/2.0/UDP
222.222.22.22:5060;received=222.222.22.22;
branch=z9hG4bKe9fec9ec;rpo
rt=5060
CSeq: 91701 INVITE
Call-ID: 5c97aa61-7fb5-49cc-b6e0-469c17785f4d@qapbx-ca1-1
From: "p-4"<sip:104@222.222.22.22:5060>;tag=063caalc
To; "p-1"<sip:YYY@222.222.22.22:5060>
Content-Length: 322
Max-Forwards: 69
Allow: INVITE,ACK,OPTIONS,BYE,CANCEL,REGISTER
P-AL-GID: cfb4aff2-3553-487f-9bde-7f72845d417c:1:3
X-Feature: call_type=regular P-AL-LEID: 1067520
Cisco-Guid: cfb4aff2-3553-487f-9bde-7f72845d417c
Content-Type: application/sdp
Contact: "p-4"<sip:104@222.222.22.22:5060>
v=0
o=-1 1 IN IP4 222.222.22.22
s=SIP call
c=IN IP4 222.222.22.22
t=0 0
a=sendrecv
m=audio 43140 RTP/AVP 105 9 0 18 8 101
a=rtpmap:105 opus/48000/2
a=rtpmap:9 G722/8000
a=rtpmap:0 PCMU/8000
a=rtpmap:18 G729/8000
a=fmtp:18 annexb=no
a=rtpmap:8 PCMA/8000
a=rtpmap:101 telephone-event/8000
a=ptime:20
a=sendrecv
INVITE sip:aaefihsv@7hfjuqmhouu.invalid;transport=ws SIP/2.0
Record-Route: <sip:222.222.22.22:5061;transport=ws;r2=on;lr=on; ftag=4cae9ae8>
Record-Route: <sip:127.0.0.1;r2=on;lr=on;ftag=4cae9ae8>
Via: SIP/2.0/WSS
222.222.22.22:5061;
branch=z9hG4bK5994.b8d158c54c38af826d7ddae0c445bad5.0
Via: SIP/2.0/UDP
222.222.22.22:5060;received=222.222.22.22;
branch=z9hG4bK108dd211;rport=5060
CSeq: 91601 INVITE
Call-ID: 55950b78-1732-43cd-8bd3-0204a456d6f4@qapbx-ca1-1
From: "p-4"<sip:104@222.222.22.22:5060>;tag=4cae9ae8
To: "p-1"<sip:ZZZ@222.222.22.22:5060>
Content-Length: 599
Max-Forwards: 69
Allow: INVITE,ACK,OPTIONS,BYE,CANCEL,REGISTER
Cisco-Guid: cfb4aff2-3553-487f-9bde-7f72845d417c
P-AL-GID: cfb4aff2-3553-487f-9bde-7f72845d417c:1:2
P-AL-LEID: 1067520
X-Feature: call_type=regular
Content-Type: application/sdp
Contact: "p-4"<sip:104@222.222.22.22:5060>
v=0
o=-1 1 IN IP4 222.222.22.22
s=SIP call
c=IN IP4 222.222.22.22
t=0 0
a=sendrecv
m=audio 43140 UDP/TLS/RTP/SAVPF 9 0 18 8 101
a=candidate:1 1 udp 2130706431 222.222.22.22 43140 typ host
a=ice-ufrag:SIFJ
a=ice-pwd:roOemi30nSq86OjTMUFvjw
a=setup:actpass
a=ssrc:1185673379 cname:hpbx@hpbx.com
a=fingerprint:sha-256 01:18:28:FA:ED:05:05:CB:6A:77:B2:CA:9D:77:88:C7:81:DC:FD:70:5F:E D:04:F3:09:90:DF:EB:0E:AC:E0:D5
a=rtcp-mux
a=rtpmap:9 G722/8000
a=rtpmap:0 PCMU/8000
a=rtpmap:18 G729/8000
a=fmtp:18 annexb=no
a=rtpmap:8 PCMA/8000
a=rtpmap:101 telephone-event/8000
a=ptime:20
a=sendrecv At operation 326, callee first device 306 answers the call. This causes a SIP OK command to be issued. The following is an example of a SIP OK command.

SIP/2.0 200 OK
Via: SIP/2.0/UDP
222.222.22.22;
branch=z9hG4bK12d3.306fcfaf13490f1f30f7f264f50bb71.0
Via: SIP/2.0/UDP
222.222.22.22:5060;received=222.222.22.22;
branch=z9hG4bK5bfaae5e;rport=5060
Record-Route: <sip:222.222.22.22;r2=on;lr=on; ftag=87064543>
Record-Route: <sip:127.0.0.1;r2=on;lr=on: ftag=87064543>
From: "p-4"<sip:104@222.222.22.22:5060>; tag=87064543
To: "p-1"<sip:XXX@222.222.22.22:5060>; tag=2604413332
Call-ID: 11fc8d40-9154-4813-bbcd-584fbdee7593@qapbx-ca1-1
CSeq: 91501 INVITE
Allow: INVITE, ACK, CANCEL, BYE, NOTIFY, REFER, OPTIONS, UPDATE, PRACK
Contact; p-1<sip;XXX@192.168.1.143:5101; transport=udp>
Privacy: none
Server: NECSDT900 ITK-32TCGS/5.4.1.6_F8B79787AF5E
Supported: replaces
Content-Type: application/sdp
Content-Length: 198
v=0
o=-0 0 IN IP4 192.168.1.143
S=
c=IN IP4 192.168.1.143
t=0 0
m=audio 30000 RTP/AVP 9 101
a=rtpmap:9 G722/8000
a=rtpmap:101 telephone-event/8000
a=fmtp:101 0-15
a=ptime:20
a=sendrecv At operation 328, the server 304 acknowledges the answer, sending an ACK command, such as the following:

ACK sip:XXX@192.168.1.143:5101;transport=udp SIP/2.0
Record-Route: <sip:222.222.22.22;r2=on;lr=on; ftag=87064543>
Record-Route: <sip:127.0.0.1;r2=on;lr=on; ftag=87064543>
Max-Forwards: 10
Via: SIP/2.0/UDP
222.222.22.22;
branch=z9hG4bK12d3.e7f2096677e03fce3eb60c4908d65346.0
Via: SIP/2.0/UDP
222.222.22.22:5060;received=222.222.22.22;
branch=z9hG4bK5bfaa e5e;rport=5060
To: "p-1"<sip:XXX@222.222.22.22:5060>;
   tag=2604413332
From: "p-4"<sip:104@222.222.22.22:5060>;
   tag=87064543
Call-ID: 11fc8d40-9154-4813-bbcd-
   584fbdee7593@qapbx-ca1-1
CSeq: 91501 ACK
Content-Length: 0
Contact: "p-4"<sip:104@222.222.22.22:5060>

At operations 330 and 332, the server 304 cancels the calls to the callee second device 308 and the callee third device 310, such as by using the following SIP cancel commands:

CANCEL sip:ZZZ@10.9.3.10:51898 SIP/2.0
Via: SIP/2.0/UDP 222.222.22.22;
   branch=z9hG4bK108dd211;rport
Call-ID: 55950b78-1732-43cd-8bd3-
   0204a456d6f4@qapbx-ca1-1
CSeq: 91601 CANCEL
From: "p-4"<sip:104@222.222.22.22:5060>;
   tag=4cae9ae8
To: "p-1"<sip:ZZZ@222.222.22.22:5060>
Contact: "p-4"<sip:104@222.222.22.22:5060>
CANCEL sip:YYY@10.9.219.81:5747 SIP/2.0
Via: SIP/2.0/UDP 222.222.22.22;
   branch=z9hG4bKe9fec9ec;rport
Call-ID: 5c97aa61-7fb5-49cc-b6e0-
   469c17785f4d@qapbx-ca1-1
CSeq: 91701 CANCEL
From: "p-4"<sip:104@222.222.22.22:5060>;
   tag=063caalc
To: "p-1"<sip:YYY@222.222.22.22:5060>
Contact: "p-4"<sip:104@222.222.22.22:5060>

User p1 then wants to initiate a call flip. At operation 334, the callee first device 306 places the call on hold, generating a hold command as follows:

INVITE sip:104@222.222.22.22:5060 SIP/2.0
Via: SIP/2.0/UDP
192.168.1.143:5101;
   branch=z9hG4bK840e00d920cae6def;rport
Route: <sip:222.222.22.22;r2=on;lr=on;ftag=87064543>
Route: <sip:127.0.0.1;r2=on;lr=on;ftag=87064543>
Max-Forwards: 69
From: "p-1"<sip:XXX@222.222.22.22:5060>;
   tag=2604413332
To: "p-4"<sip:104@222.222.22.22:5060>;tag=87064543
Call-ID: 11fc8d40-9154-4813-bbcd-
   584fbdee7593@qapbx-ca1-1
CSeq: 364161267 INVITE
Allow: INVITE, ACK, CANCEL, BYE, NOTIFY, REFER,
OPTIONS, UPDATE, PRACK
Authorization: Digest username="XXX",realm="qapbx-
   ca1-1.qaserverdata.net",
   nonce="YO7aTGDu2SAIWGYrHpDy5GWIe5fi
Z6gw",uri="sip:I104@64.78.5
2.88:5060",
   response="02b2a8c4af9070de0f43fbe45e9691bf"
Contact: p-1<sip:XXX@192.168.1.143:5101;
   transport=udp>
Privacy: none
Supported: 100rel, replaces
User-Agent: NECSDT900_ITK-32TCGS/
   5.4.1.6_F8B79787AF5E
Content-Type: application/sdp
Content-Length: 198 v=0
o=-0 1 IN IP4 192.168.1.143
s=
c=IN IP4 192.168.1.143
t=0 0
m=audio 30000 RTP/AVP 9 101
a=rtpmap;9 G722/8000
a=rtpmap:101 telephone-event/8000
a=fmtp:101 0-15
a=ptime:20
a=sendonly At operation 336, the server 304 then puts the call on hold. At operation 338, the server 304 receives a transfer request from callee first device 306. This transfer request may be in the form of a SIP REFER command, as follows:

REFER sip:104@222.222.22.22:5060 SIP/2.0
Via: SIP/2.0/UDP
192.168.1.143:5101;
   branch=z9hG4bK837f3a123afe212d4;rport
Route: <sip:222.222.22.22;r2=on;lr=on;ftag=87064543>
Route: <sip:127.0.0.1;r2=on;lr=on;ftag=87064543>
Max-Forwards: 69
From: "p-1"<sip:XXX@222.222.22.22:5060>;
   tag=2604413332
To: "p-4"<sip:104@222.222.22.22:5060>;tag=87064543
Call-ID: 11fc8d40-9154-4813-bbcd-
   584fbdee7593@qapbx-ca1-1
CSeq: 364161268 REFER
Allow: INVITE, ACK, CANCEL, BYE, NOTIFY, REFER,
OPTIONS, UPDATE, PRACK
Authorization: Digest username="XXX",realm="qapbx-
   ca1-1.qaserverdata.net",
   nonce="YO7aTGDu2SAIWGYrHpDy5GWIe5fi
Z6gw",uri="sip:104@64.78.5
2.88:5060",
   response="ac813943b6616aec8c7648db8ddd0851"
Contact: p-1<sip:XXX@192.168.1.143:5101;
   transport=udp>
Privacy: none
Refer-To: 101<sip:101@qapbx-ca1.qaserverdata.net:
   5060>
User-Agent: NECSDT900_ITK-32TCGS/
   5.4.1.6_F8B79787AF5E
Content-Length: 0

Notably, the SIP REFER command here has indicated that the extension to transfer the call is the same extension assigned to the callee first device 306, namely extension 101. At operation 340, the server 304 accepts the transfer request. This may include sending an accepted status to the callee first device 306, as follows:

SIP/2.0 202 Accepted
Record-Route: <sip:222.222.22.22;lr;ftag=87064543>
Via: SIP/2.0/UDP
192.168.1.143:5101;received=109.167.160.13;
   branch=z9hG4bK837f
3a123afe212d4;rport=5101
Call-ID: 11 fc8d40-9154-4813-bbcd-
   584fbdee7593@qapbx-ca1-1
CSeq: 364161268 REFER
From: "p-1"<sip:XXX@222.222.22.22:5060>;
   tag=2604413332
To: "p-4"<sip;104@222.222.22.22:5060>;tag=87064543
Content-Length: 0
Max-Forwards: 70
Allow: INVITE,ACK,OPTIONS,BYE,CANCEL,REGISTER Cisco-Guid: cfb4aff2-3553-487f-9bde-7f72845d417c
P-AL-LEID: 1067520
P-AL-GID: cfb4aff2-3553-487f-9bde-7f72845d417c:1:1
X-Feature: call_type=regular
Contact: "p-4" sip:104@222.222.22.22:5060
NOTIFY sip:XXX@192.168.1.143:5101;transport=udp SLP/2.0
Record-Route: <sip:222.222.22.22;r2=on; lr=onftag=87064543>
Record-Route: <sip:127.0.0.1;r2=on;lr=on; ftag=87064543>
Via: SIP/2.0/UDP 222.222.22.22;branch=z9hG4bKel d3.b6f2632af4f20c2583d831dleb 7f8c58.0
Via: SIP/2.0/UDP 222.222.22.22:5060;received=222.222.22.22; branch=z9hG4bK05be b48d,rport=5060
CSeq: 91502 NOTIFY
Call-ID: 11fc8d40-9154-4813-bbcd-584fbdee7593@qapbx-ca1-1
From: "p-4"<sip:104@222.222.22.22:5060>; tag=87064543
To: "p-1"<sip:XXX@222.222.22.22:5060>; tag=2604413332
Content-Length: 16
Max-Forwards: 69
Allow: INVITE,ACK,OPTIONS,BYE,CANCEL,REGISTER
Subscription-State: terminated;reason=noresourse
Event: refer;id=364161268
Content-Type: message/sipfrag
Contact: "p-4"<sip:104@222.222.22.22:5060>

The server 304, recognizing that the call transfer is to the same extension as one of the devices involved in the call already, knows that this is a call flip as opposed to a normal call transfer. As such, it then takes action to flip the call. As described elsewhere in this disclosure, this may include accessing rules specific to the extension about how and when other devices should be flipped. For purposes of the present example, however, it will be assumed that all other devices associated with extension 101 should be rung. First, at operation 342, the server 304 disconnects the callee first device 306, such as by using a BYE command as follows:

BYE sip:XXX@192.168.1.143:5101;transport=udp SIP/2.0
Record-Route: <sip:222.222.22.22;r2=on;lr=on; ftag=87064543>
Record-Route: <sip:127.0.0.1;r2=on;lr=on: ftag=87064543>
Via: SIP/2.0/UDP 222.222.22.22; branch=z9hG4bKfld3.84dff6520750623db7b42f4cc8 965e8b.0
Via: SIP/2.0/UDP 222.222.22.22:5060;received=222.222.22.22; branch=z9hG4bKd4edc d7d;rport=5060
CSeq: 91503 BYE
Call-ID: 11fc8d40-9154-4813-bbcd-584fbdee7593@qapbx-ca1-1
From: "p-4"<sip:104@222.222.22.22:5060>; tag=87064543
To: "p-1"<sip:XXX@222.222.22.22:5060>; tag=2604413332
Content-Length: 0
Max-Forwards: 69
Allow: INVITE,ACK,OPTIONS,BYE,CANCEL,REGISTER
Contact: "p-4"<sip:104@222.222.22.22:5060>

At operations 344 and 346, the server 304 then rings both callee second device 308 and callee third device 310, such as by using INVITE commands as follows:

INVITE sip:YYY@10.9.219.81:5747 SIP/2.0
Record-Route: <sip:222.222.22.22;r2=on;lr=on; ftag=d67cc825>
Record-Route: <sip:127.0.0.1;r2=on;lr=on; ftag=d67cc825>
Via: SIP/2.0/UDP 222.222.22.22; branch=z9hG4bKfef4.1f6bf6436263730b516c0e0cae 7166b0.0
Via: SIP/2.0/UDP 222.222.22.22:5060;received=222.222.22.22; branch=z9hG4bK1cac6 aa5;rport=5060
CSeq: 91801 INVITE
Call-ID: 5a39ff25-417e-461c-bc45-d68691a7dd36@qapbx-ca1-1
From: "p-4"<sip:104@222.222.22.22:5060>; tag=d67cc825
To: "p-1"<sip:YYY@222.222.22.22:5060>
Content-Length: 322
Max-Forwards: 69
Allow: INVITE,ACK,OPTIONS,BYE,CANCEL,REGISTER
Cisco-Guid: cfb4aff2-3553-487f-9bde-7f72845d417c
P-AL-LEID: 1067520
X-Feature: call_type=regular
P-AL-GID: cfb4aff2-3553-487f-9bde-7f72845d417c:2:1
Content-Type: application/sdp
Contact: "p-4"<sip:104@222.222.22.22:5060>
v=0
o=-1 1 IN IP4 222.222.22.22
s=SIP call
c=IN IP4 222.222.22.22
t=0 0
a=sendrecv
m=audio 43140 RTP/AVP 105 9 0 18 8 101
a=rtpmap:105 opus/48000/2
a=rtpmap:9 G722/8000
a=rtpmap:0 PCMU/8000
a=rtpmap:18 G729/8000
a=fmtp:18 annexb=no
a=rtpmap:8 PCMA/8000
a=rtpmap:101 telephone-event/8000
a=ptime:20
a=sendrecv
INVITE sip:aaefihsv@7hOfjuqmhouu.invalid; transport=ws SIP/2.0
Record-Route: <sip:222.222.22.22:5061;transport=ws;r2=on:lr=on; ftag=4165a497>
Record-Route: <sip:127.0.0.1;r2=on;lr=on; ftag=4165a497>
Via: SIP/2.0/WSS 222.222.22.22:5061; branch=z9hG4bK1a28.97cc8d8e3c45ee2b90b2a 2d7631e353a.0
Via: SIP/2.0/UDP 222.222.22.22:5060;received=222.222.22.22; branch=z9hG4bKa0e09 f98:rport=5060

CSeq: 91901 INVITE
Call-ID: ee226409-611c-44tb-8db1-6beee5252db1@qapbx-ca1-1
From: "p-4"<sip:104@222.222.22.22:5060>; tag=4165a497
To: "p-1"<sip:ZZZ@222.222.22.22:5060>
Content-Length: 630
Max-Forwards: 69
Allow: INVITE,ACK,OPTIONS,BYE,CANCEL,REGISTER
P-AL-LEID: 1067520
X-Feature: call_type=regular
Cisco-Guid: cfb4aff2-3553-487f-9bde-7f72845d417c
P-AL-GID: cfb4aff2-3553-487f-9bde-7f72845d417c:2:2
Content-Type: application/sdp
Contact: "p-4"<sip:104@222.222.22.22:5060>
v=0
o=-1 1 IN IP4 222.222.22.22
s=SIP call
c=IN IP4 222.222.22.22
t=0 0
a=sendrecv
m=audio 43140 UDP/TLS/RTP/SAVPF 9 105 0 18 8 101
a=candidate:1 1 udp 2130706431 222.222.22.22 43140 typ host
a=ice-ufrag:CwD8
a=ice-pwd:nrKiew6Nc01 gHMcQYbjB59
a=setup:actpass
a=ssrc:2127335404 cname:hpbx@hpbx.com
a=fingerprint:sha-256 01:18:28:FA:ED:05:05:CB:6A:77:B2:CA:9D:77:88:C7:81:DC:FD:7 0:5F:ED:04:F3:09:90:DF:EB:0E:AC:E0:D5
a=rtcp-mux
a=rtpmap:9 G722/8000
a=rtpmap:105 opus/48000/2
a=rtpmap:0 PCMU/8000
a=rtpmap:18 G729/8000
a=fmtp:18 annexb=no
a=rtpmap:8 PCMA/8000
a=rtpmap:101 telephone-event/8000
a=ptime:20
a=sendrecv One of the callee second device 308 and callee third device 310 then picks up. Here, it may be assumed that it is callee second device 308 that picks up, at operation 348. This may include sending an OK status, such as the following:

SIP/2.0 200 OK
Record-Route. <sip:222.222.22.22:5061;transport=ws;r2=on;lr=on; ftag=4165a497>
Record-Route: <sip:127.0.0.1;r2=on;lr-=on; ftag=4165a497>
Via: SIP/2.0/WSS 222.222.22.22:5061; branch=z9hG4bK1a28.97cc8d8e3c45ee2b90b2a 2d7631e353a.0
Via: SIP/2.0/UDP 222.222.22.22:5060;received=222.222.22.22; branch=z9hG4bKaOe09 f98;rport=5060
To: "p-1"<sip:ZZZ@222.222.22.22:5060>; tag=5hlnjm0ia9
From: "p-4"<sip:104@222.222.22.22:5060>; tag=4165a497
Call-ID: ee226409-611c-44fb-8db1-6beee5252db1@qapbx-ca1-1
CSeq: 91901 INVITE
Contact: <sip:ZZZ@qapbx-ca1.qaserverdata.net;gr=urn: uuid:9bbe8ab6-c389-4a41-8b86-e9271b3ef8df>
Session-Expires: 90;refresher=uas
Supported: timer,gruu,ice,replaces,outbound
Content-Type: application/sdp
Content-Length: 1166
v=0
o=-6342684422511533743 2 IN IP4 127.0.0.1
s=-
t=0 0
a=msid-semantic: WMS VgQyuFRHCrr6pftbiKngZgcCzSJ2FE3LDHtm
m=audio 58158 UDP/TLS/RTP/SAVPF 9 105 0 8 101
c=IN IP4 10.9.3.10
a=rtcp:9 IN IP4 0.0.0.0
a=candidate:496289276 1 udp 2122260223 10.9.3.10 58158 typ host generation 0 network-id 1
a=candidate:1394030860 1 tcp 1518280447 10.9.3.10 9 typ host tcptype active generation 0 network-id 1
a=ice-ufrag:FQyP
a=ice-pwd:rNnrtKpYjc4HL50jvzrFgGYP
a=ice-options:trickle
a=fingerprint:sha-256 BD:03:98:84:29:0F:0C: 1A:29:CD:56:1F:5D:53:CB:C0:52:91:7A:77: 13:A2:3C:26:F9:04:F4:24:34:97:40:A3
a=setup:active
a=mid:0
a=sendrecv
a=msid:VgQyuFRHCrr6pftbiKngZgcCzSJ2FE3LDHtm cacc4da2-b29-4c0b-9249-d419405395b9
a=rtcp-mux
a=rtpmap:9 G722/8000
a=rtpmap:105 opus/48000/2
a=fmtp:105 minptime=10;useinbandfec=1
a=rtpmap:0 PCMU/8000
a=rtpmap:8 PCMA/8000
a=rtpmap:101 telephone-event/8000
a=ssrc:1321063421 cname:g+JqJT5aj6t1632S
a=ssrc:1321063421 msid:VgQyuFRHCrr6pftbiKngZgcCzSJ2FE3LDHtm cacc4da2-0b29-4c0b-9249-d419405395b9
a=ssrc:1321063421 mslabel:VgQyuFRHCrr6pftbiKngZgcCzSJ2FE3LDHtm
a=ssrc:1321063421 label:cacc4da2-0b29-4c0b-9249-d419405395b9

At operation 350, the server 304 then cancels the ringing of the callee third device 310, such as by using a cancel command as follows:

CANCEL sip:YYY@10.9.219.81:5747 SIP/2.0
Via: SIP/2.0/UDP 222.222.22.22; branch=z9hG4bK1cac6aa5;rport
Call-ID: 5a39ff25-417e-461c-bc45-d68691a7dd36@qapbx-ca1-1
CSeq: 91801 CANCEL
From: "p-4"<sip:104@222.222.22.22:5060>; tag=d67cc825
To: "p-1"<sip:YYY@222.222.22.22:5060>
Contact: "p-4"<sip:104@222.222.22.22:5060>

Referring back to FIG. 1, PBX server 108 may include a call handling service. Upon receiving a call flip request from a device, which may include an identification of the device (hereinafter the originating device) and an extension to which to transfer the call, the call handling service may send the identification of the originating device and the extension to the switching component 116 of the network layer 114. The switching component 116 may then return the possible routes for the transfer, which includes a list of devices associated with the extension, whose identifications do not match the identification of the originating devices. For ease of discussion, these devices will be termed "destination devices."

The identifications of these destination devices can then be used to complete the SIP transfer request. In practice, this may actually involve having multiple SIP transfer requests, one for each destination device, and having all of the multiple SIP transfer requests be processed simultaneously, to cause ringing on all of the multiple destination devices, if appropriate. The call handling service is then also able to detect when one of these multiple SIP transfer requests is "picked up" on one of the destination devices, thus causing the active call (which is now on hold) to be transferred to the destination device that is picked up, while also cancelling the ringing on the destination devices that have not picked up.

Additionally, as described above, the call handling service is able to monitor whether no destination devices have picked up after a predetermined period of time, and ring back the originating device if that occurs.

In an example embodiment, one or more call flip rules may be stored and executed by the call handling service during this transfer process. These rules may define one or more limitations on the devices ultimately selected as destination devices for a transfer. For example, a user may have five different devices, and may initiate a transfer from a first of these devices, which ordinarily would cause the other four devices to begin ringing. However, a call flip rule may indicate one or more limitations such that not all of the other four devices begin ringing.

In one example, a call flip rule may simply designate a device as off-limits for any call flips. For example, a user may have a device that he or she wishes to only ever use for outgoing work calls, but never incoming work calls, such as a device that he or she shares with a spouse where the spouse may possibly have the device in his or her possession when the call flip is attempted.

In another example, a call flip rule may designate a device as off-limits at certain times of day, or days of week, for call flips. For example, a user may keep one of their devices at home, and may not wish the ring to disturb the occupants of the house at certain times (e.g., in the middle of the night).

In another example embodiment, a call flip rule may designate a device as off-limits for transfers from particular other devices. For example, a user may maintain a designated work phone left at the office and a designated home office phone maintained at home, while also maintaining a cell phone. The call flip rule may specify that the home office device is off-limits for a call flip from the work phone and that the work phone is off-limits for a call flip from the home office phone, as the user is not able to be in both places at the same time, making it unlikely to ever want to transfer a call from the dedicated home office phone to the work phone or vice versa. This would, however, still allow a call flip to and from either the work phone or the home office phone and the cell phone.

Figure 4:
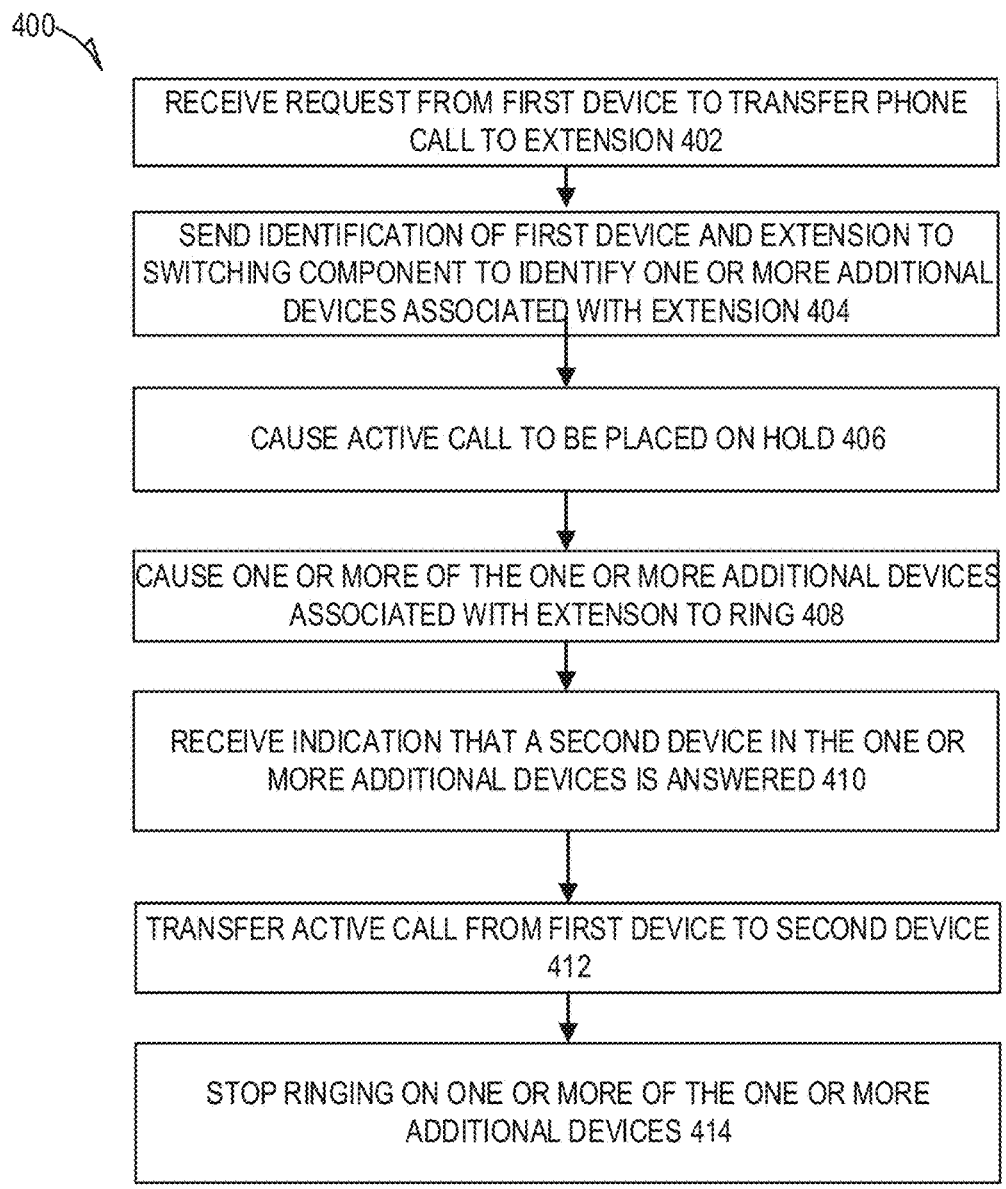
FIG. 4 is a flow diagram illustrating a method for performing a call flip in accordance with an example embodiment.

FIG. 4 is a flow diagram illustrating a method 400 for performing a call flip in accordance with an example embodiment. The method 400 may be performed at a cloud-based PBX. At operation 402, a request is received from a first device to transfer a phone call currently active on the first device to an extension corresponding to the first device. The request includes an identification of the first device and the extension. At operation 404, the identification of the first device and the extension are sent to a switching component to identify, based on a user table accessible by the switching component, one or more additional devices, other than the first device, also corresponding to the extension. This user table contains indications of which devices are associated with a user and which extension is assigned to the user. The user table may also contain, or at least reference, one or more call rules for the user, which may include which devices to ring and how, as well as potentially when the devices should ring (e.g., do-not-disturb rules).

At operation 406, the phone call currently active on the first device is caused to be placed on hold. At operation 408, one or more of the one or more additional devices also corresponding to the extension are caused to ring. At operation 410, an indication that a second device in the one or more additional devices is answered in response to the ring is received.

At operation 412, the active phone call is transferred from the first device to the second device. At operation 414, the ringing on one or more of the one or more additional devices is stopped.

Figure 5:
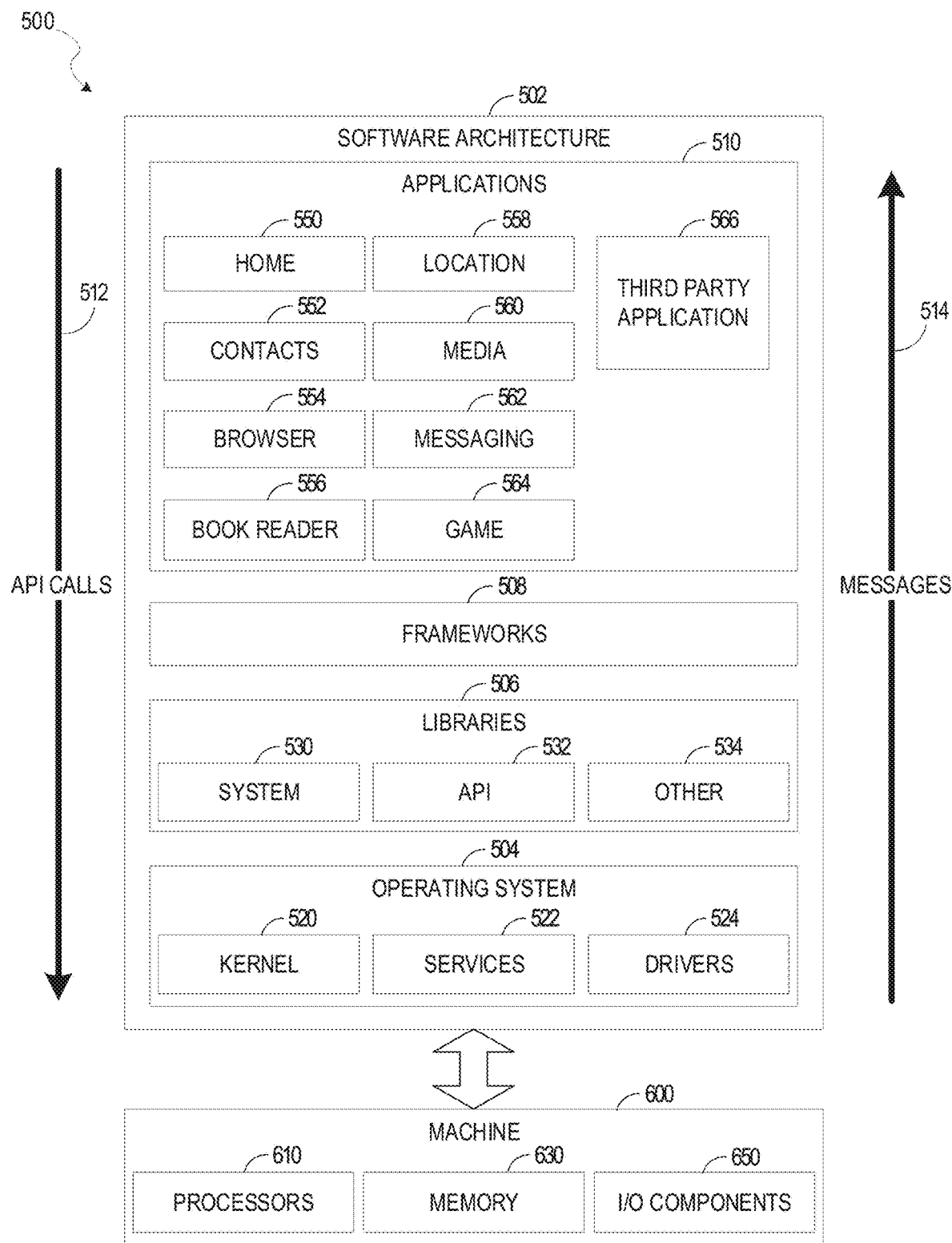
FIG. 5 is a block diagram illustrating a software architecture, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries

506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various GUI functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
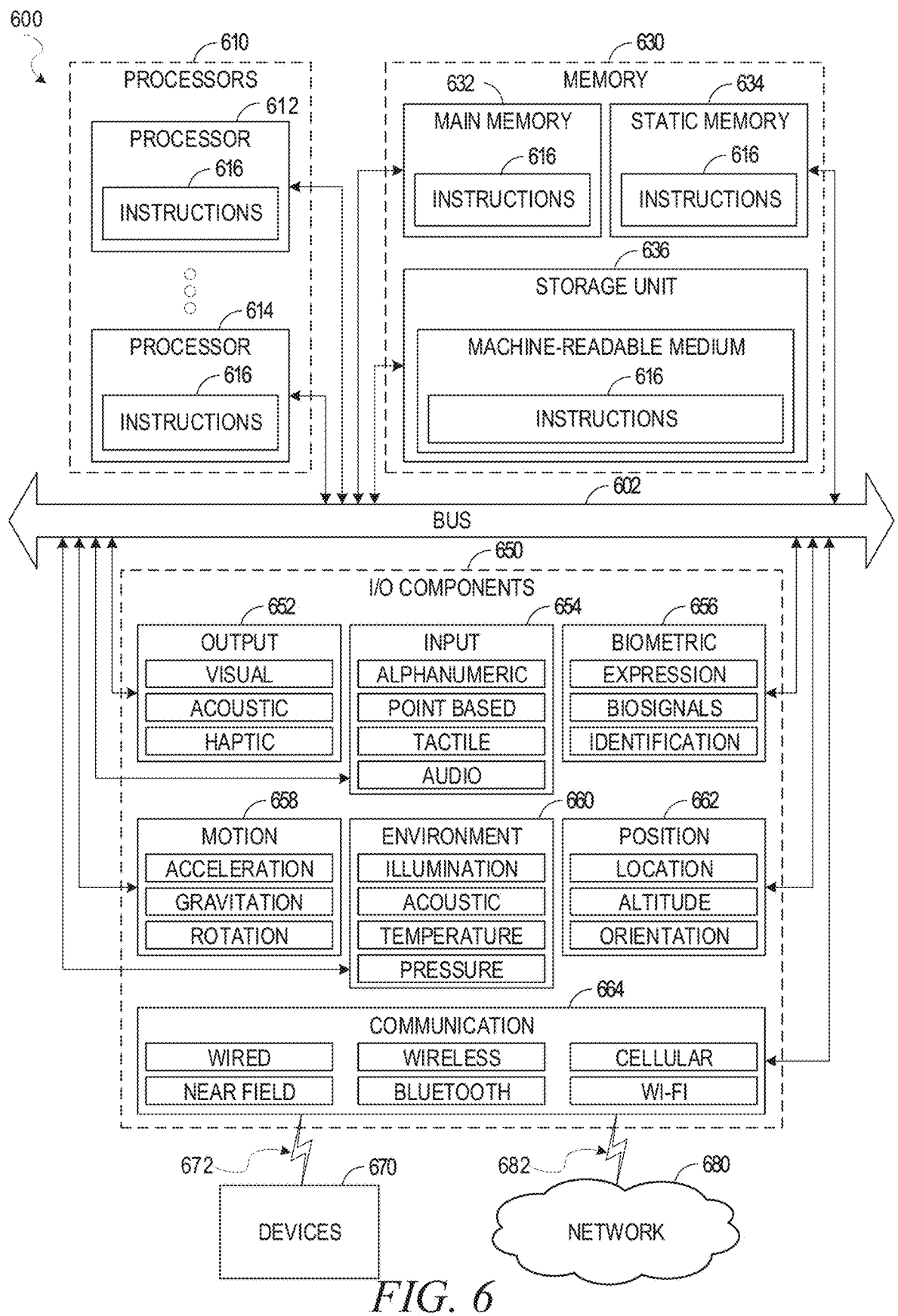
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application 510, an applet, an app, or other executable code) for causing the machine 600 to perform any one or more of the methodologies discussed herein may be executed. For example, the instructions 616 may cause the machine 600 to execute the method 400 of FIG. 4. Additionally, or alternatively, the instructions 616 may implement FIGS. 1-4, and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors 612 (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor), multiple processors 610 with a single core, multiple processors 610 with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine 600 will depend on the type of machine 600. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 616 and/or data. The terms shall accordingly be taken to include, but not be limited to, solid-state memories, and optical and magnetic media, including memory internal or external to the processors 610. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method comprising:
receiving, at a cloud-based private branch exchange (PBX), a request from a first device to transfer a phone call currently active on the first device to an extension corresponding to the first device, the request including an identification of the first device and the extension;
sending the identification of the first device and the extension to a switching component to identify, based on a user table accessible by the switching component, one or more additional devices, other than the first device, also corresponding to the extension;
causing the phone call currently active on the first device to be placed on hold;
causing one or more of the one or more additional devices also corresponding to the extension to ring;
receiving an indication that a second device in the one or more additional devices is answered in response to the ring;
in response to the receiving of the indication:
while the phone call currently active on the first device is on hold, transferring the active phone call from the first device to the second device; and
stopping the ringing on the one or more of the one or more additional devices.

2. The method of claim 1, wherein the request is a session initiation protocol (SIP) transfer request.

3. The method of claim 1, further comprising:
identifying one or more call flip rules corresponding to one or more of the one or more additional devices corresponding to the extension; and
applying the one or more call flip rules to the one or more of the one or more additional devices corresponding to the extension in order to restrict ringing of the one or more of the one or more additional devices based on the one or more call flip rules.

4. The method of claim 3, wherein the one or more call flip rules include a rule restricting a time of day when one or more of the one or more additional devices is permitting to be caused to ring for a transfer.

5. The method of claim 3, wherein the one or more call flip rules include a rule restricting one or more of the one or more additional devices from being caused to ring for a transfer from the first device.

6. The method of claim 1, wherein the first device has a dedicated button on it assigned to a call flipping function and selection of the dedicated button causes the request from the first device to transfer the phone call currently active on the first device to an extension corresponding to the first device to be sent to the cloud-based PBX.

7. The method of claim 1, wherein the cloud-based PBX is connected to a publicly switched telephone network (PSTN) and the active call is between the first device and a phone on the PSTN.

8. A system comprising:
a computer-readable medium having instructions stored thereon, which, when executed by a processor, cause the system to perform operations comprising:
receiving, at a cloud-based private branch exchange (PBX), a request from a first device to transfer a phone call currently active on the first device to an extension corresponding to the first device, the request including an identification of the first device and the extension;
sending the identification of the first device and the extension to a switching component to identify, based on a user table accessible by the switching component, one or more additional devices, other than the first device, also corresponding to the extension;
causing the phone call currently active on the first device to be placed on hold;
causing one or more of the one or more additional devices also corresponding to the extension to ring;
receiving an indication that a second device in the one or more additional devices is answered in response to the ring;
in response to the receiving of the indication:
while the phone call currently active on the first device is on hold, transferring the active phone call from the first device to the second device; and
stopping the ringing on the one or more of the one or more additional devices.

9. The system of claim 8, wherein the request is a session initiation protocol (SIP) transfer request.

10. The system of claim 8, wherein the operations further comprise:
   identifying one or more call flip rules corresponding to one or more of the one or more additional devices corresponding to the extension; and
   applying the one or more call flip rules to the one or more of the one or more additional devices corresponding to the extension in order to restrict ringing of the one or more of the one or more additional devices based on the one or more call flip rules.

11. The system of claim 10, wherein the one or more call flip rules include a rule restricting a time of day when one or more of the one or more additional devices is permitting to be caused to ring for a transfer.

12. The system of claim 10, wherein the one or more call flip rules include a rule restricting one or more of the one or more additional devices from being caused to ring for a transfer from the first device.

13. The system of claim 8, wherein the first device has a dedicated button on it assigned to a call flipping function and selection of the dedicated button causes the request from the first device to transfer the phone call currently active on the first device to an extension corresponding to the first device to be sent to the cloud-based PBX.

14. The system of claim 8, wherein the cloud-based PBX is connected to a publicly switched telephone network (PSTN) and the active call is between the first device and a phone on the PSTN.

15. A non-transitory machine-readable storage medium comprising instructions, which when implemented by one or more machines, cause the one or more machines to perform operations comprising:
   receiving, at a cloud-based private branch exchange (PBX), a request from a first device to transfer a phone call currently active on the first device to an extension corresponding to the first device, the request including an identification of the first device and the extension;
   sending the identification of the first device and the extension to a switching component to identify, based on a user table accessible by the switching component, one or more additional devices, other than the first device, also corresponding to the extension;
   causing the phone call currently active on the first device to be placed on hold;
   causing one or more of the one or more additional devices also corresponding to the extension to ring;
   receiving an indication that a second device in the one or more additional devices is answered in response to the ring;
   in response to the receiving of the indication:
   while the phone call currently active on the first device is on hold, transferring the active phone call from the first device to the second device; and
   stopping the ringing on the one or more of the one or more additional devices.

16. The non-transitory machine-readable storage medium of claim 15, wherein the request is a session initiation protocol (SIP) transfer request.

17. The non-transitory machine-readable storage medium of claim 15, wherein the operations further comprise:
   identifying one or more call flip rules corresponding to one or more of the one or more additional devices corresponding to the extension; and
   applying the one or more call flip rules to the one or more of the one or more additional devices corresponding to the extension in order to restrict ringing of the one or more of the one or more additional devices based on the one or more call flip rules.

18. The non-transitory machine-readable storage medium of claim 17, wherein the one or more call flip rules include a rule restricting a time of day when one or more of the one or more additional devices is permitting to be caused to ring for a transfer.

19. The non-transitory machine-readable storage medium of claim 17, wherein the one or more call flip rules include a rule restricting one or more of the one or more additional devices from being caused to ring for a transfer from the first device.

20. The non-transitory machine-readable storage medium of claim 15, wherein the first device has a dedicated button on it assigned to a call flipping function and selection of the dedicated button causes the request from the first device to transfer a phone call currently active on the first device to an extension corresponding to the first device to be sent to the cloud-based PBX.

* * * * *